United States Patent
Akune et al.

(10) Patent No.: US 10,491,427 B2
(45) Date of Patent: Nov. 26, 2019

(54) COMPUTER SYSTEM, GATEWAY APPARATUS CONTROL METHOD AND STORAGE MEDIUM

(71) Applicant: Hitachi, Ltd., Tokyo (JP)

(72) Inventors: Ken Akune, Tokyo (JP); Kazuhiro Maeda, Tokyo (JP); Junji Kinoshita, Tokyo (JP); Osamu Takada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/755,312

(22) PCT Filed: Mar. 10, 2016

(86) PCT No.: PCT/JP2016/057536
§ 371 (c)(1),
(2) Date: Feb. 26, 2018

(87) PCT Pub. No.: WO2017/154163
PCT Pub. Date: Sep. 14, 2017

(65) Prior Publication Data
US 2018/0248715 A1 Aug. 30, 2018

(51) Int. Cl.
*H04W 4/44* (2018.01)
*H04W 4/90* (2018.01)
(Continued)

(52) U.S. Cl.
CPC .......... *H04L 12/66* (2013.01); *G06F 9/45558* (2013.01); *H04L 49/70* (2013.01);
(Continued)

(58) Field of Classification Search
CPC ..... H04L 12/66; H04L 61/2557; H04L 49/70; H04L 61/256; H04L 61/2061;
(Continued)

(56) References Cited

U.S. PATENT DOCUMENTS 8,289,968 B1 * 10/2012 Zhuang .............. H04L 61/2517
370/252
8,942,235 B1 * 1/2015 Vinapamula Venkata ...................
H04L 63/02
370/254

(Continued)

OTHER PUBLICATIONS

"NSX Administration Guide," VMWare, Inc., Palo Alto, CA., WMware NSX for vSphere 6.2, pp. 19-20, pp. 66-75, pp. 81-86, [online], [searched on Mar. 8, 2016], Internet <URL: https://pubs.vmware.com/NSX-62/topic/com.vmware.ICbase/PDF/nsx_62_admin.pdf>.

(Continued)

*Primary Examiner* — Ajay Cattungal
*Assistant Examiner* — Mohammed S Chowdhury
(74) *Attorney, Agent, or Firm* — Mattingly & Malur, PC

(57) ABSTRACT

The number of IP pools is increased independently of the number of network interfaces coupled to an external network. In response to a registration request requesting registration of an IP address pool, which is a part of an IP address space, in a first network, a control apparatus is configured to cause a processor to execute: generating a logical interface configured to operate as a logical network interface; logically coupling the logical interface to a logical switch; generating a NAT module logically coupled to a second network interface and configured to mutually convert an IP address in the IP address pool and an IP address in a second network; and logically coupling the NAT module to the logical interface.

13 Claims, 16 Drawing Sheets

(51) Int. Cl.
*H04W 48/18* (2009.01)
*H04L 29/08* (2006.01)
*H04L 12/66* (2006.01)
*G06F 9/455* (2018.01)
*H04L 12/931* (2013.01)
*H04L 29/12* (2006.01)

(52) U.S. Cl.
CPC ........ *H04L 61/2061* (2013.01); *H04L 61/256* (2013.01); *H04L 61/2557* (2013.01); *H04L 67/10* (2013.01); *H04L 67/1036* (2013.01); *G06F 2009/45595* (2013.01); *H04L 61/2514* (2013.01); *H04L 61/2521* (2013.01); *H04L 67/1002* (2013.01)

(58) Field of Classification Search
CPC . H04L 67/10; H04L 67/1036; H04L 67/1002; H04L 61/2514; H04L 61/2521; G06F 9/45558; G06F 2009/45595

USPC .......................................................... 370/401
See application file for complete search history.

(56) References Cited

U.S. PATENT DOCUMENTS

| 2015/0074793 | A1 | 3/2015 | Dalvi et al. |
| 2015/0363221 | A1* | 12/2015 | Terayama ........... H04L 12/4641 718/1 |
| 2016/0234161 | A1* | 8/2016 | Banerjee ................. H04L 67/10 |
| 2017/0093790 | A1* | 3/2017 | Banerjee ............. H04L 61/2007 |

OTHER PUBLICATIONS

International Search Report of PCT/JP2016/057536 dated May 31, 2016.

* cited by examiner

Fig.8

Logical interface management table  521

| Logical interface ID (801) | Logical interface name (802) | IP pool ID (803) | Logical switch ID (804) |
|---|---|---|---|
| LIF-1 | LIF1 | P-A | VSW-1 |
| LIF-2 | LIF2 | P-B | VSW-1 |
| LIF-3 | LIF3 | P-C | VSW-2 |
| ... | ... | ... | ... |

Fig.9

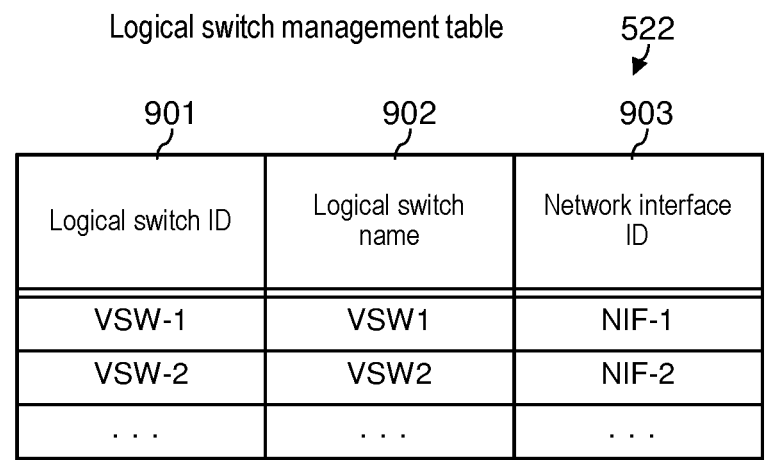

Logical switch management table   522

| Logical switch ID | Logical switch name | Network interface ID |
|---|---|---|
| VSW-1 | VSW1 | NIF-1 |
| VSW-2 | VSW2 | NIF-2 |
| . . . | . . . | . . . |

IP pool management table    523

| IP pool ID | Start IP address | End IP address |
|---|---|---|
| P-A | IP-A1 | IP-A254 |
| P-B | IP-B1 | IP-B50 |
| P-C | IP-C1 | IP-C254 |
| ... | ... | ... |

IP address management table          524

| IP address | Status | IP pool ID |
|---|---|---|
| IP-A1 | Used | P-A |
| IP-A2 | Unused | P-A |
| IP-A3 | Used | P-A |
| . . . | . . . | . . . |

IP pool management table            721

| IP pool ID | NAT function ID | IP address | Status |
|---|---|---|---|
| P-A | A | IP-A1 | Used |
| P-A | A | IP-A2 | Used |
| … | … | … | … |

1201, 1202, 1203, 1204

Communication performance management table 1501

| IP pool ID | Communication performance |
|---|---|
| A | Number of communication packets: 100000 |
| B | Number of communication packets: 5000 |
| C | Number of communication packets: 10000 |
| ... | ... |

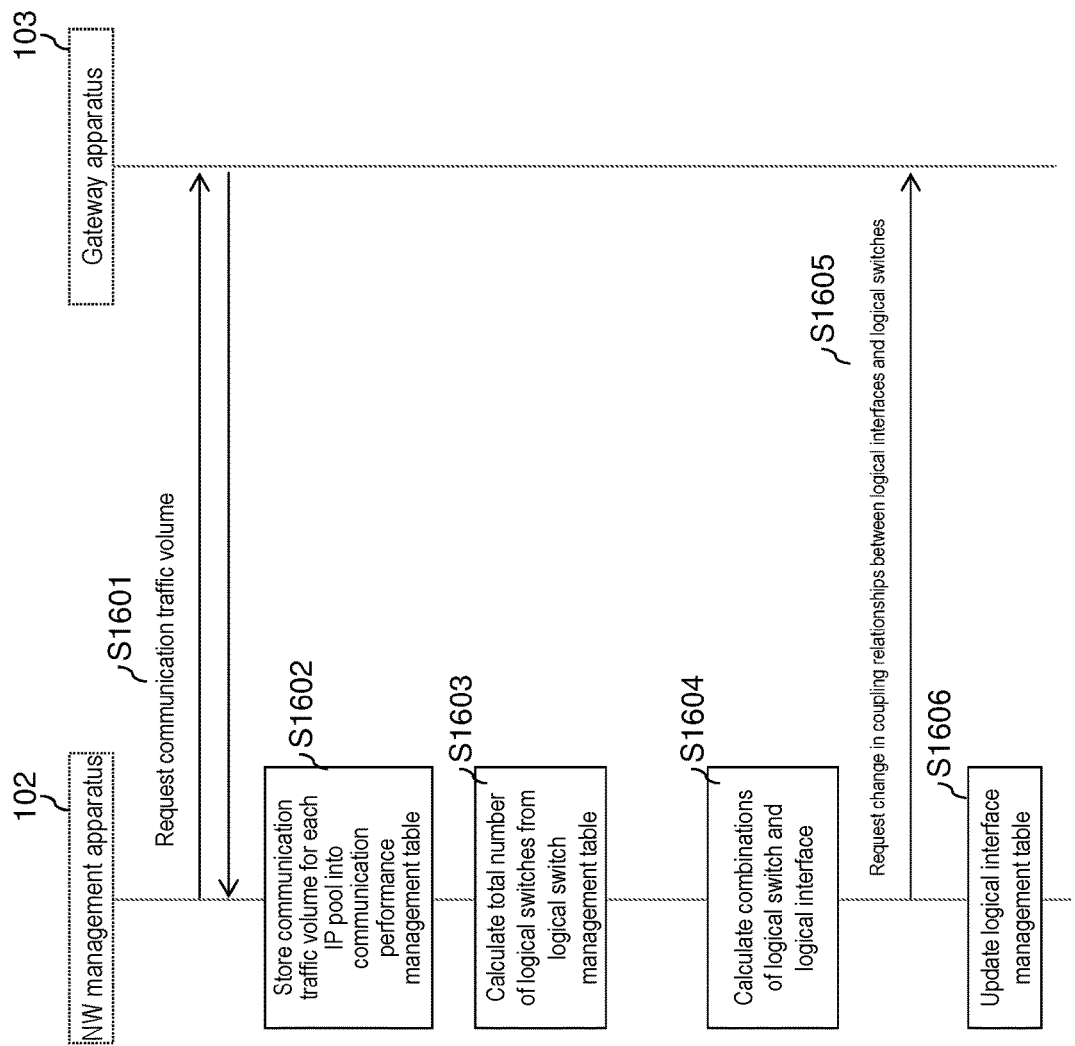

COMPUTER SYSTEM, GATEWAY APPARATUS CONTROL METHOD AND STORAGE MEDIUM

TECHNICAL FIELD

The present invention relates to a computer system.

BACKGROUND ART

Recently, use of clouds has been advanced in companies, organizations and the like to speed up system construction, improve a use rate of computer resources, and the like. Furthermore, accompanying improvement of functions of cloud management software for providing a cloud environment, and the like, the number of companies which construct clouds in their own DCs (Data Centers) is increasing.

By deploying NAT (Network Address Translation) or the like at a boundary between an external network outside a cloud environment, for example, the Internet and an internal network of the cloud environment, the cloud management software provides the internal network with an IP address space different from that of the external network.

In general, a cloud administrator or the like configures an IP address pool (hereinafter referred to as an IP pool) obtained by pooling IP addresses of the external network. The cloud management software acquires an IP address from the IP pool in response to a request of a cloud user and adds a rule for converting the IP address and an IP address of the internal network to the NAT. Thereby, the cloud user can access a VM on the internal network from the external network.

It is ideally desirable that an IP address range of the IP pool is long and continuous. Actually, however, when an internal network is coupled to an existing external network such as a global network or an in-company network, a lot of short and continuous IP address ranges (hereinafter referred to as fragmented IP address ranges) are put into the IP pool. Therefore, it is necessary to flexibly add an IP pool.

In PTL 1, it is disclosed to deploy an edge gateway which provides network function such as a NAT function for each tenant, on a computer system.

In NPL 1, it is disclosed to deploy an edge gateway (NSX Edge and Edge Services Gateway) which provides network functions such as the NAT function, on a computer system similarly to PTL1.

CITATION LIST

Patent Literature

PTL 1: Specification of U.S. Pat. Publication No. 2015/0074793

Non Patent Literature

NPL 1: VMWare, Inc., "NSX Administration Guide," pp. 19-20, pp. 66-75, pp. 81-86, [online], [searched on Mar. 8, 2016], Internet <URL: https://pubs.vmware.com/NSX-62/topic/com.vmware-.ICbase/PDF/nsx_62_admin.pdf>

SUMMARY OF INVENTION

Technical Problem

In a computer system like that of NPL 1, since a network interface to be an exit for communication packets from an internal network to an external network and a NAT function have a fixed dependence relationship. Therefore, the number of NAT functions is restricted to the number of network interfaces. In general, it is assumed that the maximum number of network interfaces is about 10 to 30 in a virtual environment and is smaller in a physical environment. Therefore, the number of IP pools is also restricted to the number of network interfaces. This problem is not examined in PTL 1.

Solution to Problem

In order to solve the above problem, a computer system which is an aspect of the present invention is provided with a gateway apparatus and a control apparatus coupled to the gateway apparatus. The gateway apparatus includes: a first network interface coupled to a first network; a second network interface coupled to a second network; and a processor coupled to the first network interface and the second network interface. The control apparatus causes the processor to execute: generating a logical switch configured to operate as a logical network switch; and coupling the logical switch to the first network interface. In response to a registration request requesting registration of an IP address pool which is a part of an IP address space in the first network, the control apparatus causes the processor to execute: generating a logical interface configured to operate as a logical network interface; logically coupling the logical interface to the logical switch; generating a NAT module logically coupled to the second network interface and configured to mutually convert an IP address in the IP address pool and an IP address in the second network; and logically coupling the NAT module to the logical interface.

Advantageous Effect of Invention

It is possible to increase the number of IP pools independently of the number of network interfaces coupled to an external network.

BRIEF DESCRIPTION OF DRAWINGS

FIG. 8 shows a configuration example of a logical interface management table 521.

FIG. 9 shows a configuration example of a logical switch management table 522.

FIG. 10 shows a configuration example of an IP pool management table 523 of the NW management apparatus 102.

FIG. 11 shows a configuration example of an IP address management table 524 of the NW management apparatus 102.

FIG. 12 shows a configuration example of an IP pool management table 721 of the cloud management apparatus 110.

FIG. 16 is a sequence diagram showing a configuration change process of a third embodiment.

DESCRIPTION OF EMBODIMENTS

Embodiments of the present invention will be described below with the use of drawings.

Though information may be described by an expression of "xxx table" in the description below, information may be expressed by any data structure. That is, in order to show that information is not dependent on a data structure, "xxx table" can be called "xxx information". Further, a configuration of each table is an example in the description below. One table may be divided into two or more tables, and all or a part of two or more tables may be one table.

In the description below, in the case of describing components of the same kind without distinguishing the components from each other, reference symbols or a common number of the reference symbols will be used; and, in the case of describing components of the same kind, distinguishing the components from each other, reference symbols of the components are used, or IDs allocated to the components may be used instead of the reference symbols.

[First Embodiment]

Figure 1:
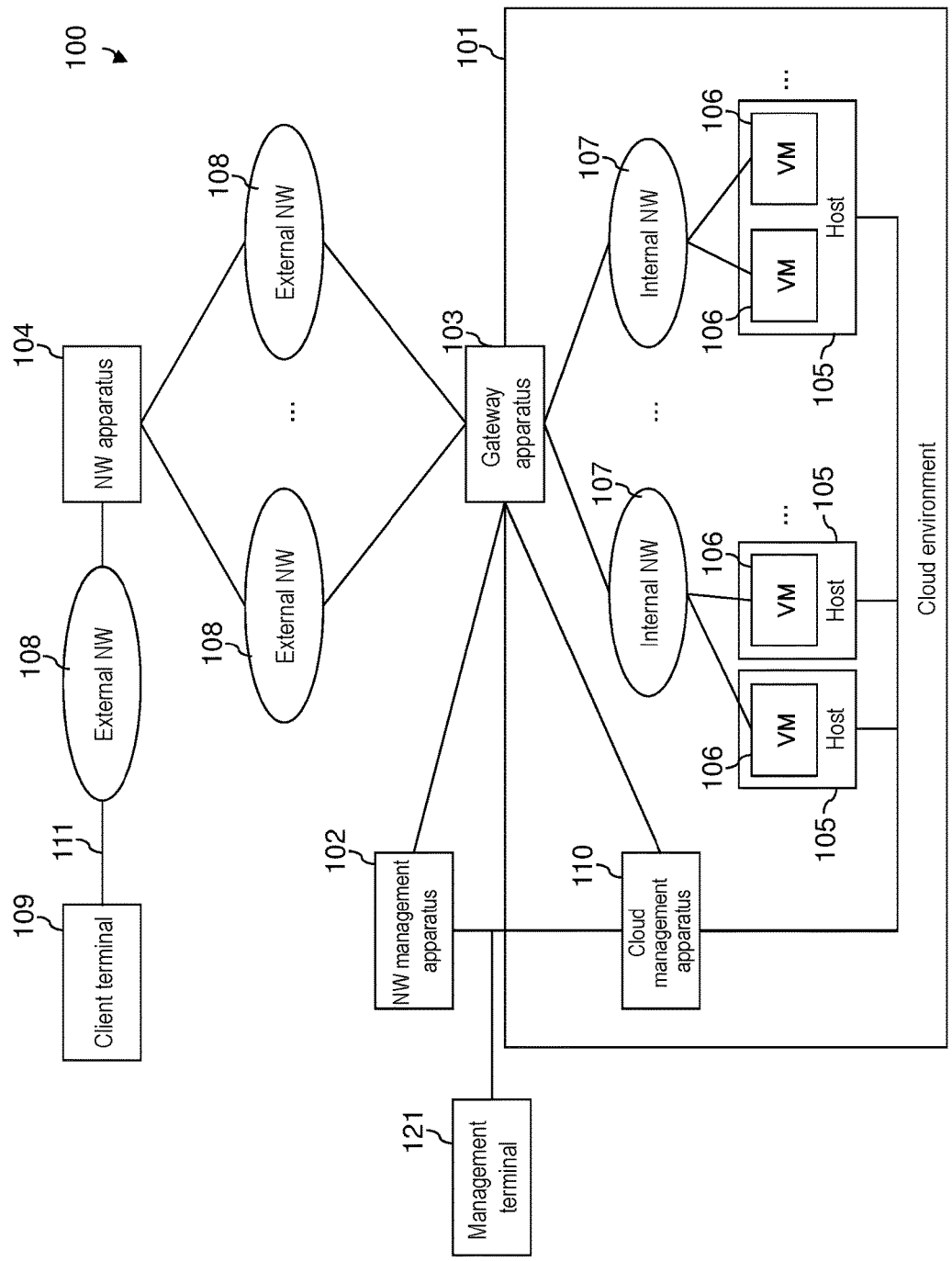
FIG. 1 shows a configuration of a network system according to a first embodiment.

FIG. 1 shows a configuration of a network system according to a first embodiment.

A network system 100 includes a cloud environment 101, some external networks 108, a network (NW) apparatus 104, a client terminal 109 and a network (NW) management apparatus 102. The cloud environment 101 includes a gateway apparatus 103, some internal networks (NWs) 107, some hosts 105 and a cloud management apparatus 110. The host 105 generates a VM 106 by executing a hypervisor or the like.

The client terminal 109 is coupled to the gateway apparatus 103 via the some external networks 108 and the NW apparatus 104. The host 105 is coupled to the gateway apparatus 103 via the internal network 107. Thereby, the VM 105 existing in the cloud environment 101 and the client terminal 109 are mutually and communicably coupled by the gateway apparatus 103 and the NW apparatus 104. The gateway apparatus 103 is coupled to the NW management apparatus 102 and the cloud management apparatus 110.

The gateway apparatus 103 includes an address conversion function, for example, a NAT (Network Address Translation) function or the like in addition to a layer 2 switching function and a layer 3 switching function for performing a communication packet transfer process. Address of communication packet from the VM 106 is converted by the gateway apparatus 103 by passing through the gateway apparatus 103. Thereby, the VM 106 of the cloud environment 101 can communicate with apparatus outside the cloud environment 101. An implementation form of the gateway apparatus 103 may be either a physical machine or a virtual machine. Further, the number of the gateway apparatuses 103 is not limited to one but may be two or more.

The host 105 is computer which executes zero or more VMs. Though description will be made on an assumption that the host is physical machine in the present embodiment, implementation form of the host 105 may be virtual machine.

The VM 106 is a computer which communicates with the other VMs. Though description will be made on an assumption that the VM is virtual machine in the present embodiment, implementation form of the VM may be physical machine.

The internal NW 107 is NW coupling the VM 106 and the gateway apparatus 103, and, in the present embodiment, the internal NW 107 may use either an encapsulated communication packet or an unencapsulated communication packet if being separated from the other internal NWs 107. As the internal NW 107, for example, private LAN (Local Area Network) constructed by the cloud management apparatus 110 is used.

The external NW 108 is physical NW outside the cloud environment. As the external NW 108, for example, the Internet, dedicated line, WAN (Wide Area Network) and in-company LAN is used.

The NW apparatus 104 is a layer 3 switch which mainly performs a communication packet transfer process. An implementation form of the NW apparatus 104 may be either a physical apparatus or a virtual apparatus.

The client terminal 109 is a terminal operated by a cloud user. By the cloud user operating the client terminal 109, the client terminal 109 accesses the VM 106 in the cloud environment.

The NW management apparatus 102 manages information about IP pools, information about IP addresses, information about a logical configuration in the gateway apparatus 103 and the like, and controls the gateway apparatus 103 based on these pieces of information. The NW management apparatus 102 may be deployed in any of the internal NW 107 and the external NW 108 if being in an environment capable of communicating with the gateway apparatus 103. Further, the number of the NW management apparatuses 102 is not limited to one but may be two or more. An implementation form of the NW management apparatus 102 may be either a physical machine or a virtual machine.

The cloud management apparatus 110 manages information about the gateway apparatus 103, information about the host 105 and information about the VM 106, and controls the gateway apparatus 103 and the host 105 based on these pieces of information. When accepting a request to create a VM 106 from the client terminal 109 in response to an operation by the cloud user, the cloud management apparatus 110 deploys a VM 106 in the cloud environment. Furthermore, when accepting a request to access the VM 106 from the client terminal 109, the cloud management apparatus 110 adds a rule for conversion between an IP address of an external NW and an IP address of an internal NW, to a NAT function of the gateway apparatus 103. As a result of these, the cloud user can access the VM 106 in the cloud environment 101 using the client terminal 109. An implementation form of the cloud management apparatus 110 may be either a physical machine or a virtual machine. Further, a conventional cloud management apparatus can be used as the cloud management apparatus 110. Further, the NW management apparatus 102 and the cloud management apparatus 110 may be integrated.

A management terminal 121 is coupled to the NW management apparatus 102 and the cloud management apparatus 110. The management terminal 121 acquires information from the NW management apparatus 102 and the cloud management apparatus 110 and displays the acquired information. Further, the management terminal 121 accepts an input from a cloud administrator and transmits the accepted information to the NW management apparatus 102 and the cloud management apparatus 110. An administrator of the NW management apparatus 102 and the administrator of the cloud management apparatus 110 may be the same or may be different from each other.

Figure 2:
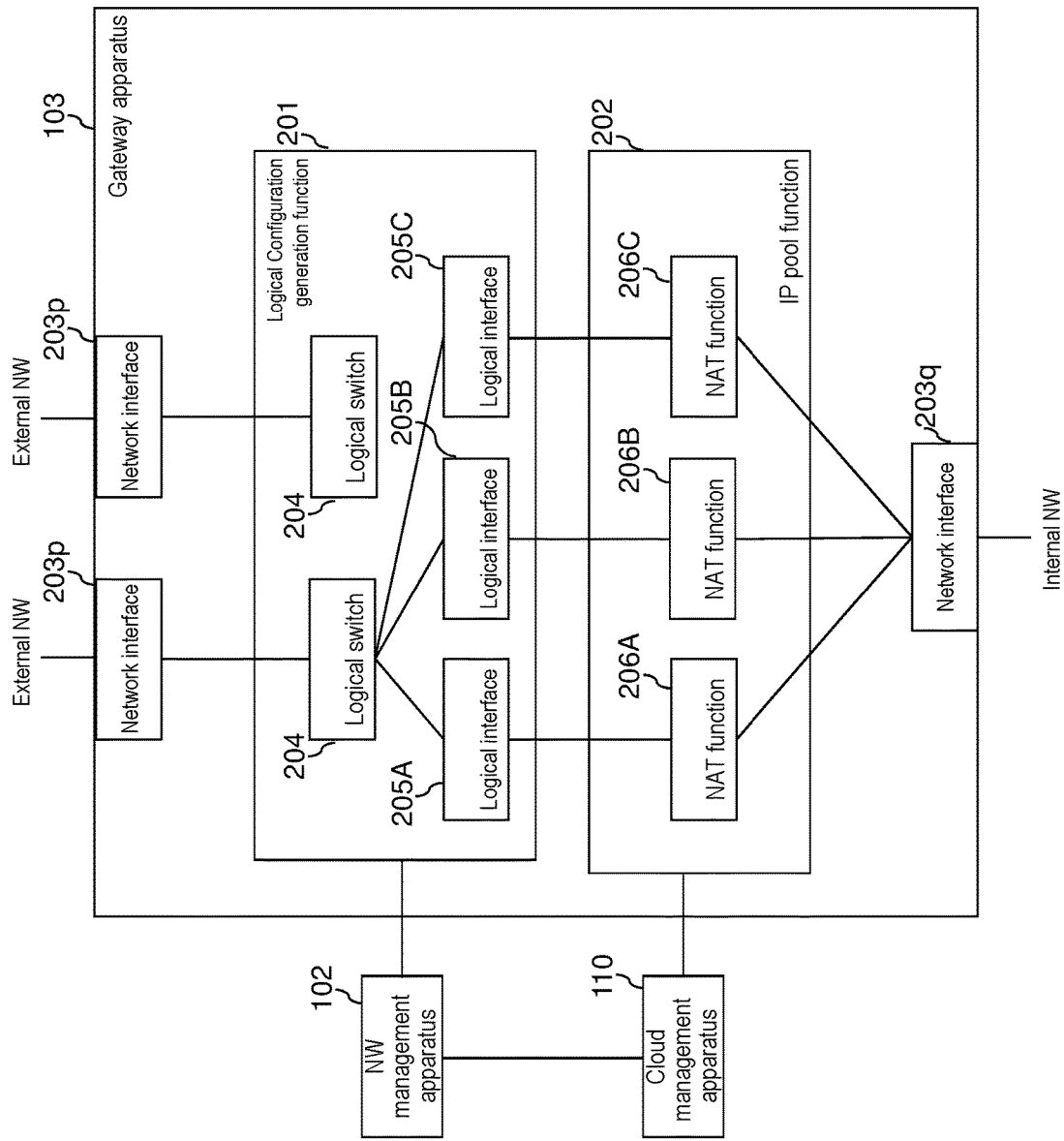
FIG. 2 shows a configuration of a gateway apparatus 103.

FIG. 2 shows a configuration of the gateway apparatus 103.

Here, description will be made on a case where the gateway apparatus 103 is a physical machine. The gateway apparatus 103 includes a plurality of network interfaces 203p and 203q. Furthermore, the gateway apparatus 103 executes a logical configuration generation function 201 and an IP pool function 202.

The logical configuration generation function 201 generates one or more logical switches 204 and one or more logical interfaces 205A, 205B and 205C. The IP pool function 202 generates one or more NAT functions 206A, 206B and 206C. The NAT functions may be called NAT modules. The logical interfaces may be called logical interface modules. The logical switches may be called logical switch modules.

The logical switches 204 operate as logical network switches and operate as layer 2 switches which mainly perform a communication packet transfer process. Further, when accepting a request to change a configuration of couplings between the network interfaces 203p and the logical interfaces from the NW management apparatus 102, the logical configuration generation function 201 changes the configuration based on the request. The logical switches 204 are logically coupled to one network interface 203p and logically coupled to some logical interfaces 205.

The logical interfaces 205 operate as logical network interfaces and operate as layer 2 switches which mainly perform a communication packet transfer process. The logical interfaces 205 is logically coupled to one logical switch 204 and logically coupled to one NAT function 206.

The NAT functions 206 perform conversion between an IP address of an external NW and an IP address of an internal NW. The NAT functions 206 can provide an IP address space different from an IP address space of the external NW for the internal NW. The NAT function 206 is logically coupled to one logical interface 205 and logically coupled to one network interface 203q.

The logical switches 204 stores a MAC address table showing associations between MAC addresses and ports of the logical switch 204. The logical switch 204 transfers a communication packet to a port corresponding to a MAC address of a destination of the communication packet, based on the MAC address table. If receiving a communication packet having a MAC address not stored in the MAC address table as a destination from the network interface 203p, the logical switch 204 broadcasts the communication packet to the logical interfaces 205. The logical interface 205 transfers the communication packet to the NAT function 206. When receiving the communication packet destined to the NAT function 206, the NAT function 206 transmits responses to the logical switch 204 via the logical interface 205. When receiving the response, the logical switch 204 registers MAC address of transmission source of the response with the MAC address table.

The gateway apparatus 103 of the present embodiment executes a kernel. In response to a request from the NW management apparatus 102, the gateway apparatus 103 generates the NAT functions 206 as kernel modules for extending functions of the kernel. When the NAT function 206 is kernel module, each of the logical interface 205 and the logical switch 204 is generated as a kernel module. Thereby, the gateway apparatus 103 can easily generate the NAT function 206, the logical interface 205 and the logical switch 204.

The NAT function 206 may be executed by a virtual machine. In this case, the gateway apparatus 103 executes a hypervisor. In response to a request from the NW management apparatus 102, the hypervisor generates a virtual machine, and the virtual machine executes the NAT function 206. In the case where the NAT function 206 is executed by the virtual machine, the logical interface 205 may be virtual network interface in the virtual machine, and the logical switch 204 may be virtual switch. The virtual network interface and the virtual switch are generated by the hypervisor. Thereby, the gateway apparatus 103 can easily generate the NAT function 206, the logical interface 205 and the logical switch 204.

In description below, to the end of a reference symbol indicating a logical interface coupled to the NAT function 206A or an IP address added to the NAT function 206A, an end character "A" of the reference symbol indicating the corresponding NAT function 206A is attached. Similarly, to the end of a reference symbol indicating a logical interface coupled to the NAT function 206B or an IP address added to the NAT function 206B, an end character "B" of the reference symbol indicating the corresponding NAT function 206B is attached. Similarly, to the end of a reference symbol indicating a logical interface coupled to the NAT function 206C or an IP address added to the NAT function 206C, an end character "C" of the reference symbol indicating the corresponding NAT function 206C is attached. For example, a logical interface A indicates a logical interface coupled to the NAT function A.

The network interface 203p is interface for coupling the external NW 108 and the inside of the gateway apparatus. The network interface 203q is interface for coupling the internal NW 107 and the inside of the gateway apparatus. Implementation form of the network interface 203 may be physical interface or virtual interface. The network interface 203p may be called external network interface. The network interface 203q may be called internal network interface.

The gateway apparatus 103 transfers a communication packet transferred from the external NW 108 to the network interface 203p to the NAT function 206 via the logical switch 204 and the logical interface 205, converts an IP address of the communication packet in the external NW to an IP address in an internal NW using the NAT function 206, transfers the converted communication packet to the network interface 203q, and transfers the communication packet to the internal NW 107 from the network interface 203q.

The gateway apparatus 103 transfers a communication packet transferred from an internal NW 107 to the network interface 203q to a NAT function 206, converts an IP address of the communication packet in the internal NW to an IP address in an external NW using the NAT function 206, transfers the converted communication packet to the network interface 203p via the logical interface 205 and the logical switch 204, and transfers the communication packet to the external NW 108 from the network interface 203p.

Such a network system 100 can, by coupling the network interface 203p and the NAT function 206 via the logical switch 204 and the logical interface 205, freely decide a connection relationship between the network interface 203p and the NAT function 206 and freely add the NAT function 206.

Figure 3:
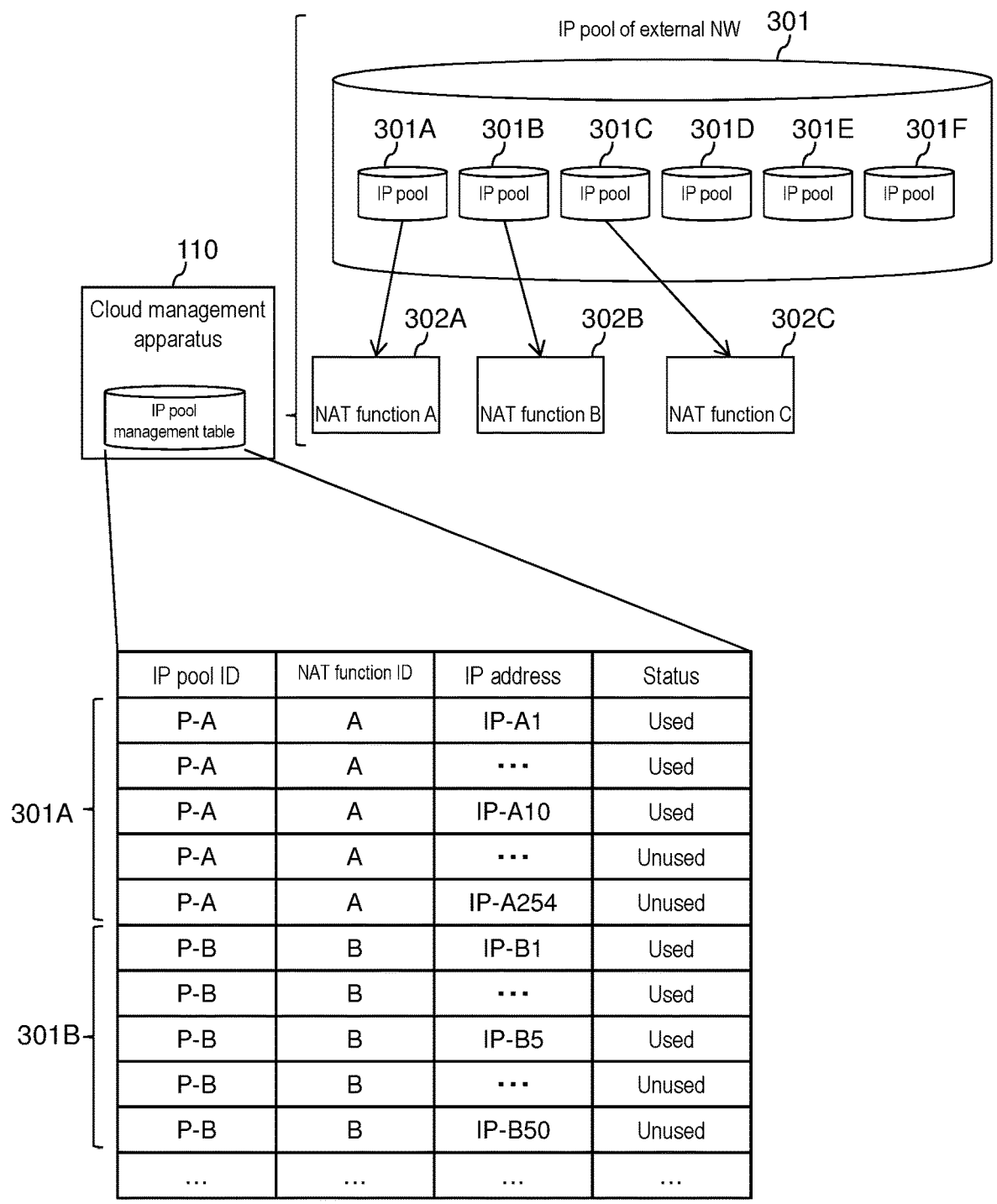
FIG. 3 shows a relationship between an IP pool of an external NW and IP pools associated with NAT functions.

FIG. 3 shows a relationship between an IP pool of an external NW and IP pools associated with NAT functions. Each of IP pools 301A to 301F is a part of an IP pool 301 of an external NW. For example, when accepting a request to register the IP pool 301A, the cloud management apparatus 110 registers the IP pool 301A and the NAT function 302A with an IP pool management table in association with each other. Further, when accepting a request to acquire an IP address allocated to a virtual machine or the like in an internal NW, from the client terminal 109 or the like, the cloud management apparatus 110 acquires an IP address from the IP pool 301A, adds a rule about the IP address to the NAT function, and records that the IP address is used, to the IP pool management table.

By this operation, the IP pools 301A to 301F managed by the IP pool management table in the cloud management apparatus 110 become fragmented IP address ranges.

There is a possibility that, for each IP pool, the number of all IP addresses in the IP pool and the number of used IP addresses may be different. In the example of this figure, the IP pool 301A stores 254 IP addresses, and, among the IP addresses, the number of used IP addresses is 10 and the number of unused IP addresses is 244. The IP pool 301B stores 50 IP addresses, and, among the IP addresses, the number of used IP addresses is 45 and the number of unused IP addresses is 5. Thus, in the present embodiment, it is considered that there is a possibility that the number of stored IP addresses and the number of used IP addresses are different among the IP pools.

Figure 4:
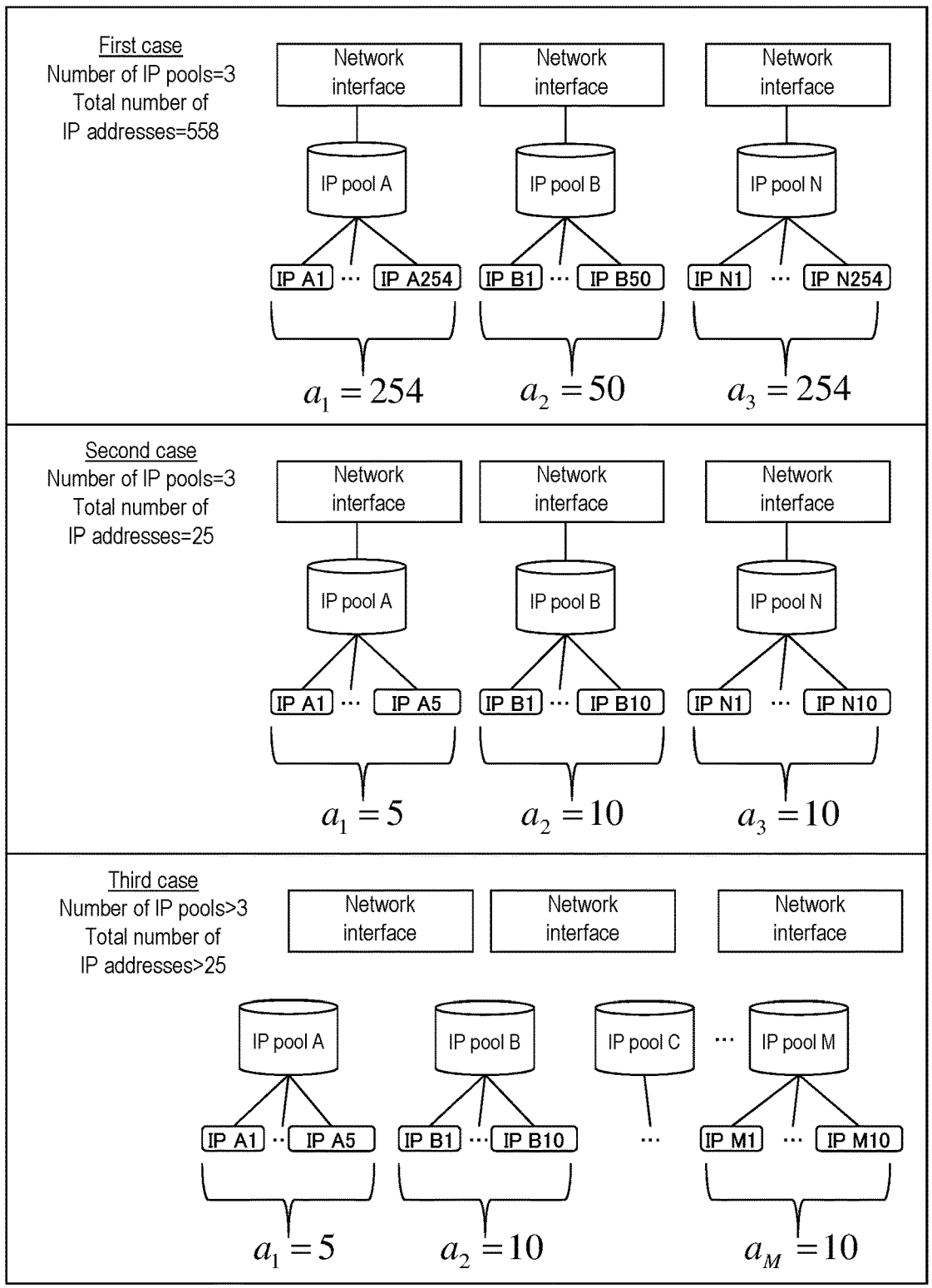
FIG. 4 shows specific examples of an IP pool management method.

FIG. 4 shows a specific example of an IP pool management method.

In a case where an external network interface and an IP pool have a fixed dependence relationship as they conventionally do, a gateway apparatus cannot create more IP pools than the number of external network interfaces. As comparison examples, an IP pool management method in which one IP pool is fixed for one external network interface will be described in a first case and a second case. Further, an IP pool management method of the present embodiment will be described in a third case. Here, it is assumed that the number of external network interfaces is three. Effects of the present embodiment, however, are not restricted by the number of external network interfaces.

The first case shows a case where IP pools A, B and C corresponding to the three external network interfaces, respectively, are registered. The IP pools A, B and C store 254, 50 and 254 IP addresses, respectively, and a total of 558 IP addresses can be stored. On the other hand, in the second case, the IP pools A, B and C store 5, 10 and 10 IP addresses, respectively, and only a total of 25 IP addresses are stored. When one gateway apparatus is used in spite of the above situations, it is not possible to create more IP pools. That is, in the IP pool management method of the comparison examples, an upper limit of the number of pools is the number of external network interfaces.

In the third case, since the fixed dependence relationship between an external network interface and an IP pool can be excluded, it is possible to, even if the number of external network interfaces is three, deploy more than three IP pools. Therefore, the cloud administrator can use a desired number of IP addresses irrespective of the number of external network interfaces. That is, in the IP pool management method of the embodiment, the number of IP pools is not restricted by the number of external network interfaces, and an upper limit of a total of IP addresses in all IP pools is the number of IP addresses allocated from an external NW.

Figure 5:
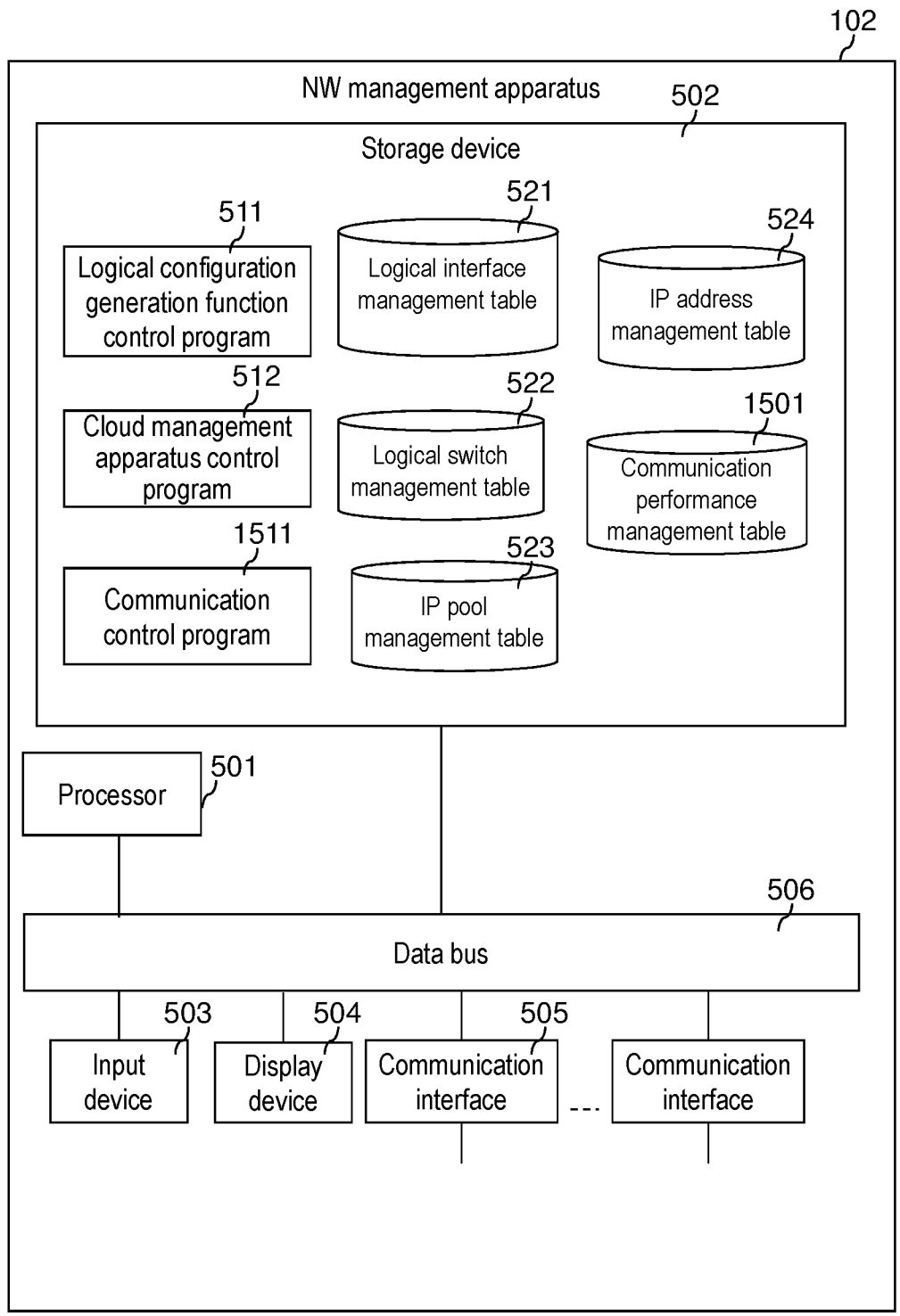
FIG. 5 is a block diagram showing an example of a hardware configuration of an NW management apparatus 102.

FIG. 5 is a block diagram showing an example of a hardware configuration of the NW management apparatus 102.

In the present embodiment, description will be made on a case where the NW management apparatus 102 is a physical machine. The NW management apparatus 102 includes a processor 501, a storage device 502, an input device 503, a display device 504 and communication interfaces 505. The units of the NW management apparatus 102 are mutually coupled via a bus 506. The NW management apparatus 102 may be a virtual machine.

The processor 501 controls the NW management apparatus 102.

The storage device 502 stores a logical configuration generation function control program 511, a cloud management apparatus control program 512, a communication control program 1511, a logical interface management table 521, a logical switch management table 522, an IP pool management table 523, an IP address management table 524 and a communication performance management table 1501. The storage device 502 is a non-transitory or transitory storage medium and is also a work area of the processor 501. Both of the programs 511 and 512 may be stored in the storage device 502 in advance or may be introduced from a computer-readable storage medium or an external apparatus as necessary. The storage device 502 is, for example, a ROM (Read Only Memory), a RAM (Random Access Memory), an HDD (Hard Disk Drive) or a flash memory.

The storage device 502 of the present embodiment may store neither the communication control program 1511 nor the communication performance management table 1501. The communication control program 1511 and the communication performance management table 1501 will be described in a third embodiment.

The input device 503 is used to input data and is, for example, a keyboard, a mouse, a touch panel, a numeric keypad or a scanner. The display device 504 is, for example, a display for displaying data. The communication interface 505 is coupled to an internal NW and an external NW to transmit and receive data.

The processor 501 realizes various processes described below using the storage device 502 and the communication interfaces 505, by executing the various programs 511 and 512. In description below, the programs 511 and 512 will be described as executing entities.

A part or all of functions realized by the programs 511 and 512 may be realized by dedicated hardware.

The logical configuration generation function control program 511 refers to the logical interface management table 521, the logical switch management table 522, the IP pool management table 523 and the IP address management table 524 to instruct the logical configuration generation function 201 of the gateway apparatus 103 to change a configuration. The logical configuration generation function control program 511 realizes load balance according to an arbitrary condition for each IP pool by changing a configuration of the logical switches 204 and the logical interfaces 205.

The cloud management apparatus control program 512 collects use statuses of IP addresses in the IP pools from the cloud management apparatus 110 and stores the use statuses into the IP address management table 524.

The logical interface management table 521, the logical switch management table 522, the IP pool management table 523 and the IP address management table 524 will be described later.

Figure 6:
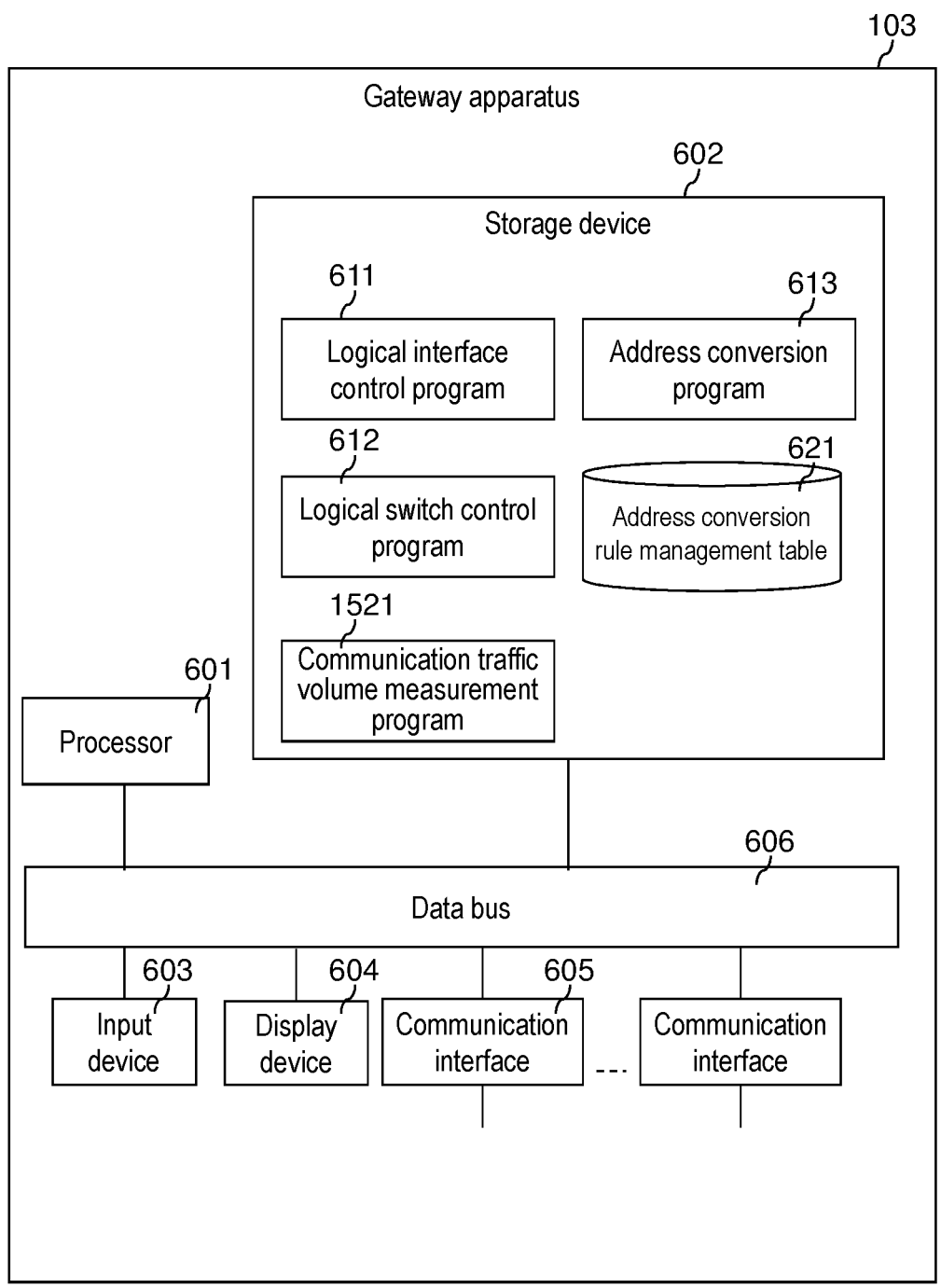
FIG. 6 is a block diagram showing an example of a hardware configuration of the gateway apparatus 103.

FIG. 6 is a block diagram showing an example of a hardware configuration of the gateway apparatus 103.

In the present embodiment, description will be made on the case where the gateway apparatus 103 is a physical machine. The gateway apparatus 103 includes a processor 601, a storage device 602, an input device 603, a display device 604 and communication interfaces 605. The units of the gateway apparatus 103 are mutually coupled via a bus 606. The gateway apparatus 103 may be a virtual machine.

The storage device 602 stores a logical interface control program 611, a logical switch control program 612, an address conversion program 613, a communication traffic volume measurement program 1521 and an address conversion rule management table 621. The storage device 602 is a non-transitory or transitory storage medium and is also a work area of the processor 601. The programs 611 to 613 may be stored in the storage device 602 in advance or may be introduced from a computer-readable storage medium or an external apparatus as necessary. The storage device 602 is, for example, a ROM (Read Only Memory), a RAM (Random Access Memory), an HDD (Hard Disk Drive) or a flash memory.

The storage device 602 of the present embodiment may not store the communication traffic volume measurement program 1521. The communication traffic volume measurement program 1521 will be described in the third embodiment.

The input device 603 is used to input data, and there are, for example, a keyboard, a mouse, a touch panel, a numeric keypad and a scanner. The display device 604 is, for example, a display for displaying data. The plurality of communication interfaces 605 include the network interfaces 203p and 203q.

The processor 601 realizes various processes described below using the storage device 602 and the communication interfaces 605, by executing the programs 611 to 613. In description below, the programs 611 to 613 will be described as executing entities.

A part or all of functions realized by the programs 611 to 613 may be realized by dedicated hardware.

The logical interface control program 611 is a function of creating or deleting the logical interface 205 based on a logical configuration specified by the NW management apparatus 102. Furthermore, the logical interface control program 611 is a function of coupling the logical interface 205 and the NAT function 206.

The logical switch control program 612 is a function of changing a configuration of the network interfaces 203p and the logical switches 204 and a configuration of the logical switches 204 and the logical interfaces 205 based on configurations specified by the NW management apparatus 102. When accepting a request to change a configuration of the logical switches 204 and the logical interfaces 205 from the NW management apparatus 102, the logical switch control program 612 changes the configuration of the logical switches 204 and the logical interfaces 205 of the gateway apparatus 103 to realize load balance according to an arbitrary condition for each IP pool.

The address conversion program 613 performs an IP address conversion process based on a NAT rule requested by the NW management apparatus 102 or the cloud management apparatus 110. The requested rule is stored into the address conversion rule management table 621.

The logical configuration generation function 201 is realized by the logical interface control program 611 and the logical switch control program 612. The IP pool function 202 is realized by the address conversion program 613.

Figure 7:
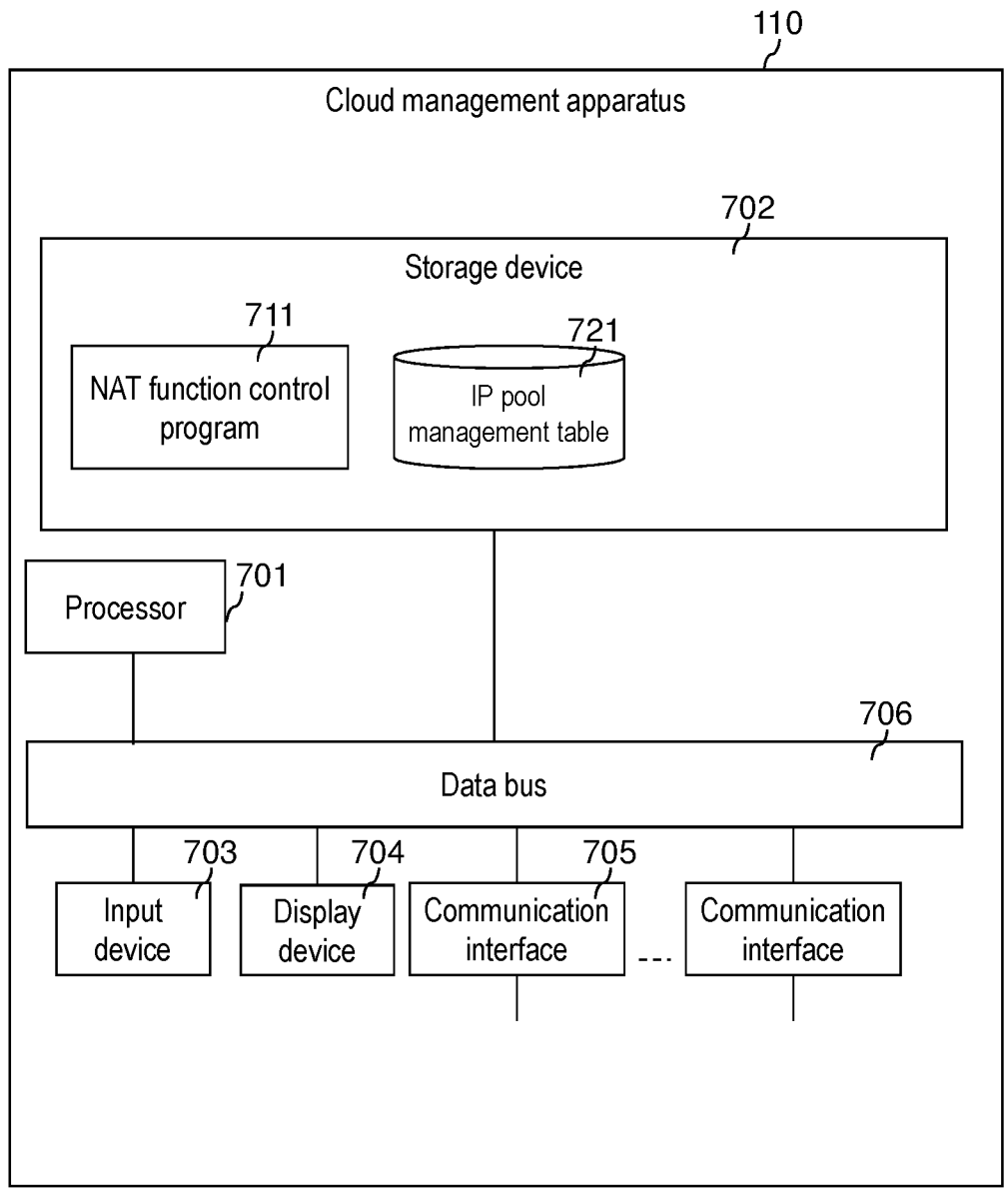
FIG. 7 is a block diagram showing an example of a hardware configuration of a cloud management apparatus 110.

FIG. 7 is a block diagram showing an example of a hardware configuration of the cloud management apparatus 110.

In the present embodiment, description will be made on a case where the cloud management apparatus 110 is a physical machine. The cloud management apparatus 110 includes a processor 701, a storage device 702, an input device 703, a display device 704 and a communication interface 705. The units of the cloud management apparatus 110 are mutually coupled via a bus 706. The cloud management apparatus 110 may be a virtual machine.

The storage device 702 stores a NAT function control program 711 and an IP pool management table 721. The storage device 702 is a non-transitory or transitory storage medium and is also a work area of the processor 701. The program 711 may be stored in the storage device 702 in advance or may be introduced from a computer-readable storage medium or an external apparatus as necessary. The storage device 702 is, for example, a ROM (Read Only Memory), a RAM (Random Access Memory), an HDD (Hard Disk Drive) or a flash memory.

The input device 703 is used to input data, and there are, for example, a keyboard, a mouse, a touch panel, a numeric keypad and a scanner. The display device 704 is, for example, a display for displaying data. The communication interface 705 connects to an internal NW and an external NW to transmit and receive data.

The processor 701 realizes various processes described below using the storage device 702 and the communication interface 705, by executing the various programs 711. In description below, the programs 711 and 712 will be described as executing entities.

A part or all of functions realized by the program 711 may be realized by dedicated hardware.

The NAT function control program 711 refers to the IP pool management table 721 and an IP address management table 722 to instruct the NAT function 206 to add or delete an address conversion rule.

The IP pool management table 721 will be described later.

FIG. 8 shows a configuration example of the logical interface management table 521.

The logical interface management table 521 is information for managing coupling relationships between logical interfaces and IP pools and coupling relationships between the logical interfaces and logical switch IDs, and is created by an operation or an instruction by the cloud administrator at the time of the cloud administrator registering IP pools.

The logical interface management table 521 has an entry for each logical interface 205. Each entry has a logical interface ID 801, a logical interface name 802, an IP pool ID 803 and a logical switch ID 804.

The logical interface ID 801 stores an ID for uniquely identifying a logical interface as a value. The logical interface name 802 stores a name of the logical interface configured in the gateway apparatus 103 as a value. The IP pool ID 803 stores an ID for uniquely identifying an IP pool corresponding to the logical interface as a value and is referred to when information about an IP pool is acquired from the IP pool management table 523. The logical switch ID 804 stores an ID for uniquely identifying a logical switch coupled to the logical interface as a value and is referred to when information about a logical switch is acquired from the logical switch management table 522.

FIG. 9 shows a configuration example of the logical switch management table 522.

The logical switch management table 522 is information for managing coupling relationships between logical switches and physical interfaces and is created by an operation or an instruction by the cloud administrator when the gateway apparatus 103 is installed.

The logical switch management table 522 has an entry for each logical switch 204. Each entry has a logical switch ID 901, a logical switch name 902 and a network interface ID 903.

The logical switch ID 901 stores an ID for uniquely identifying a logical switch as a value. The logical switch name 902 stores a name of the logical switch configured in the gateway apparatus 103 as a value. The network interface ID 903 stores an ID for uniquely identifying an external network interface coupled to the logical switch as a value.

FIG. 10 shows a configuration example of the IP pool management table 523 of the NW management apparatus 102.

The IP pool management table 523 is information for managing a range of IP addresses of an external network which can be used in the cloud environment and is created by an operation or an instruction by the cloud administrator.

The IP pool management table 523 has an entry for each IP pool. Each entry has an IP pool ID 1001, a start IP address 1002 and an end IP address 1003.

The IP pool ID 901 stores an ID for uniquely identifying an IP pool as a value. The start IP address 902 stores an IP address of a start point of a range of IP addresses of an external network which can be used in the IP pool as a value. The end IP address 903 stores an IP address of an end point of the IP address range as a value.

FIG. 11 shows a configuration example of the IP address management table 524 of the NW management apparatus 102.

The IP address management table 524 is information for managing use statuses of IP addresses and is a management table storing values acquired from the cloud management apparatus 110.

The IP address management table 524 has an entry for each IP address. Each entry has an IP address 1101, a status 1102 and an IP pool ID 1103.

The IP address 1101 stores an IP address. The status 1102 stores a value showing whether the IP address is used or not. For example, "used" in the status 1102 shows that the IP address is allocated to a virtual machine or the like in an internal NW. For example, "unused" in the status 1102 shows that the IP address is not allocated to a virtual machine or the like in the internal NW. The IP pool ID 1103 stores an ID for uniquely identifying an IP pool to which the IP address belongs, as a value, and is referred to when an IP pool is identified.

FIG. 12 shows a configuration example of the IP pool management table 721 of the cloud management apparatus 110.

The IP pool management table 721 has an entry for each IP pool. Each entry has an IP pool ID 1201, a NAT function ID 1202, an IP address 1203 and a status 1204.

The IP pool ID 1201 stores an ID for uniquely identifying an IP pool as a value. The NAT function ID 1202 stores an ID for uniquely identifying a NAT function corresponding to the IP pool as a value. The IP address 1203 stores an IP address of an external network corresponding to the IP pool. The status 1204 stores a value showing a use status of the IP address 1203 (used or unused).

Operation of the network system 100 of the present embodiment will be described below.

Figure 13:
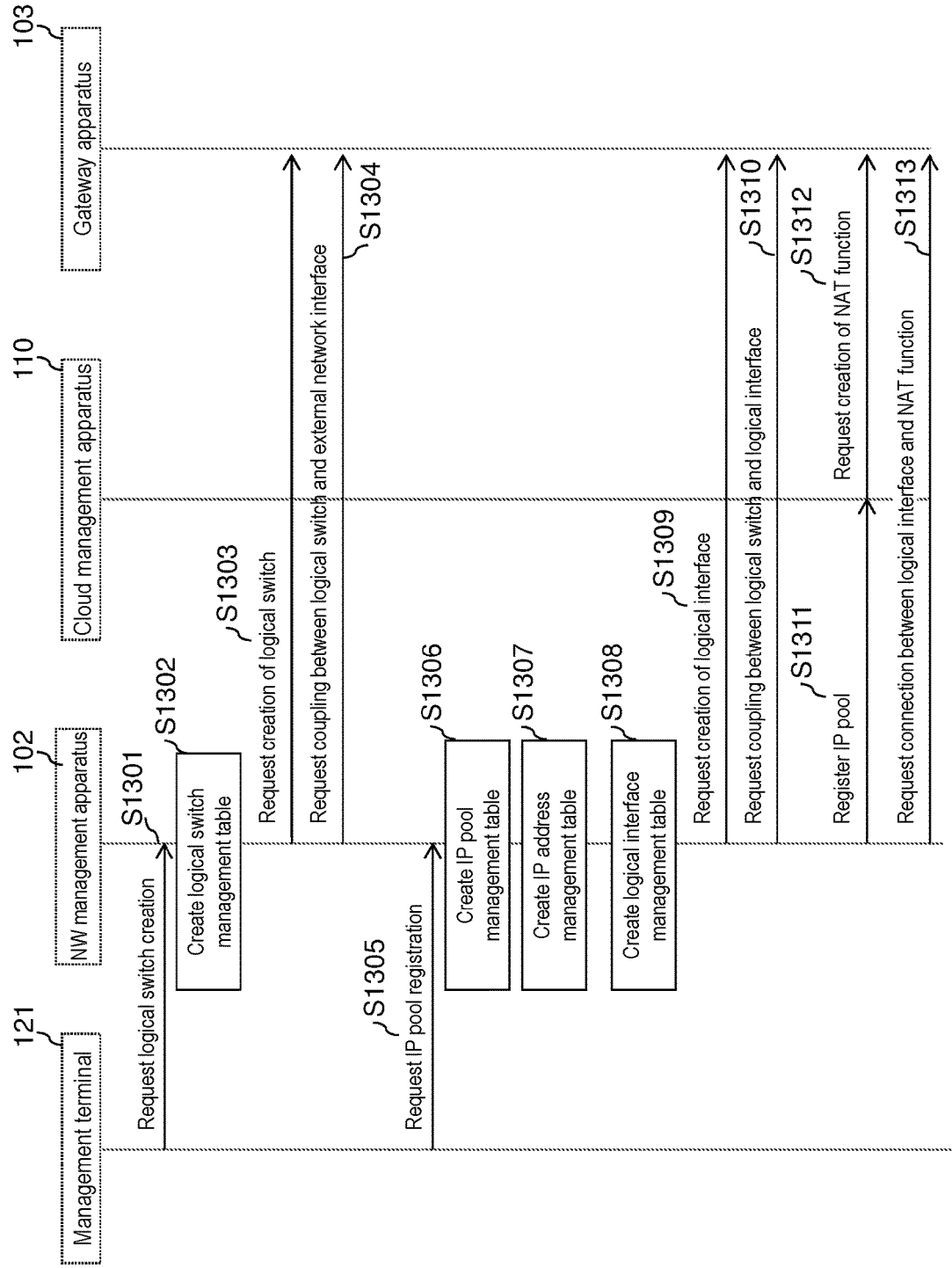
FIG. 13 is a sequence diagram showing a logical switch generation process and an IP pool registration process.

FIG. 13 is a sequence diagram showing a logical switch generation process and an IP pool registration process.

In the present embodiment, in response to an operation of a CLI (Command Line Interface) or a GUI (Graphical User Interface) of the management terminal 121, the management terminal 121 transmits a request to the NW management apparatus 102. A protocol at the time of transmission may be a well-known scheme such as SSH (Secure Shell) and HTTP (Hypertext Transfer Protocol) or may be an original scheme. A reply message from the NW management apparatus 102 to the management terminal 121 or the like is transmitted via the GUI or the like. The client terminal 109 may be used instead of the management terminal 121.

A request message from the NW management apparatus 102 to the gateway apparatus 103 is transmitted, for example, using the CLI or the GUI. A protocol at the time of transmission may be a well-known scheme such as SSH (Secure Shell) and HTTP (Hypertext Transfer Protocol) or may be an original scheme. Further, a format of a reply message from the gateway apparatus 103 to the NW management apparatus 102 may be by a well-known scheme such as RFC 7159 or may be by an original scheme.

At the time of constructing the network system 100, when accepting a request to create logical switches from the management terminal 121 operated by the cloud administrator (step S1301), the NW management apparatus 102 executes the logical switch generation process (steps 1301 to S1304). After that, the NW management apparatus 102 creates the logical switch management table 522 (step S1302). After that, the NW management apparatus 102 requests the gateway apparatus 103 to create logical switches (step S1303) and requests couplings between the logical switches and external network interfaces (step S1304). The gateway apparatus 103 creates a logical switch for each external network interface and couples a corresponding logical switch to each external network interface.

Specifically, for example, when accepting NIF-1 as a network interface ID, as an input value from the management terminal 121, the NW management apparatus 102 issues values of VSW-1 and VSW1 as a logical switch ID and a logical switch name, respectively, and stores the pieces of information into the logical switch management table 522. Furthermore, the NW management apparatus 102 requests the gateway apparatus 103 to create a logical switch the logical switch name of which is VSW1 and requests coupling between the logical switch the logical switch name of which is VSW1 and an external network interface the network interface ID of which is NIF-1.

There are one or more cloud administrators and one or more management terminals 121. The NW management apparatus 102 may accept requests from two or more cloud administrators and two or more management terminals 121. Further, the NW management apparatus 102 may accept one or more requests from one cloud administrator and one management terminal 121.

The NW management apparatus 102 repeats the above logical switch generation process the number of times corresponding to the number of accepted requests.

Description will be made on a case where the cloud administrator inputs registration of an IP pool to the management terminal 121 after that. When receiving an IP pool registration request from the management terminal 121 (step S1305), the NW management apparatus 102 executes the IP pool registration process (steps S1305 to S1313). After that, the NW management apparatus 102 creates the IP pool management table 523, the IP address management table 524 and the logical interface management table 521 (steps S1306 to S1308). After that, the NW management apparatus 102 requests the gateway apparatus to create logical interface (step S1309) and requests couplings between the logical switch and the logical interface (step S1310). The gateway apparatus 103 creates a logical interface and couples the logical interface to the logical switch.

Furthermore, the NW management apparatus 102 requests the cloud management apparatus 110 to register an IP pool (step S1311). When accepting the request, the cloud management apparatus 110 registers the IP pool with the IP pool management table 721 and requests the gateway apparatus 103 to create a NAT function (step S1312). The gateway apparatus 103 creates NAT function to be coupled to the internal network interface.

The NW management apparatus 102 requests the gateway apparatus 103 to connect the logical interfaces and the NAT functions (step S1313). The gateway apparatus 103 connects the NAT function to the logical interface.

Specifically, for example, when accepting IP-A1 as a start IP address and IP-A254 as an end IP address, as input values from the management terminal 121, the NW management apparatus 102 issues a value of P-A as an IP pool ID, and stores these pieces of information into the IP pool management table 523. Furthermore, the NW management apparatus 102 stores information about a relation between each of IP addresses included in a range between the start IP address and the end IP address and the IP pool ID into the IP address management table 524. Here, at the time of constructing the IP pool, the NW management apparatus 102 puts "unused" into the status of corresponding entry in the IP address management table 524.

The NW management apparatus 102 issues values of LIF-1 and LIF1 as a logical interface ID and a logical interface name, respectively, refers to the logical switch management table 522 to identify an entry the logical switch ID of which is VSW-1, and stores information of the entry into the logical interface management table 521.

The NW management apparatus 102 requests the gateway apparatus 103 to create a logical interface the logical interface name of which is LIF1 and requests coupling between the logical interface the logical interface name of which is LIF1 and the logical switch the logical switch name of which is VSW1.

The NW management apparatus 102 requests the cloud management apparatus 110 to register an IP address range the start IP address of which is IP-A1 and the end IP address of which is IP-A254.

The cloud management apparatus 110 stores the IP address range into the IP pool management table 721 and requests the gateway apparatus 103 to create a NAT function.

The NW management apparatus 102 requests the gateway apparatus 103 to connect the logical interface the logical interface name of which is LIF1 and the NAT function.

The NW management apparatus 102 repeats the above IP pool registration process the number of times corresponding to the number of accepted requests.

The network system of the present embodiment is capable of excluding a fixed dependence relationship between an external network interface and a NAT function and increasing the number of IP pools without depending on the number of external network interfaces of the gateway apparatus 103 and capable of creating the number of IP pools exceeding the number of network interfaces. Further, since the cloud administrator can register a lot of IP pools, he can allocate a small number of IP pools at a time and can make good use of a limited number of IP addresses of an external NW.

[Second Embodiment]

Realistically, for each IP pool, the number of used IP addresses and a communication traffic volume differ. In the present embodiment, description will be made on an example of deciding a configuration of the logical interfaces and the logical switches in consideration of the number of IP addresses to be used. Since the configuration of the network system 100 and the configuration of the gateway apparatus 103 are the same as the first embodiment, description will be omitted.

Figure 14:
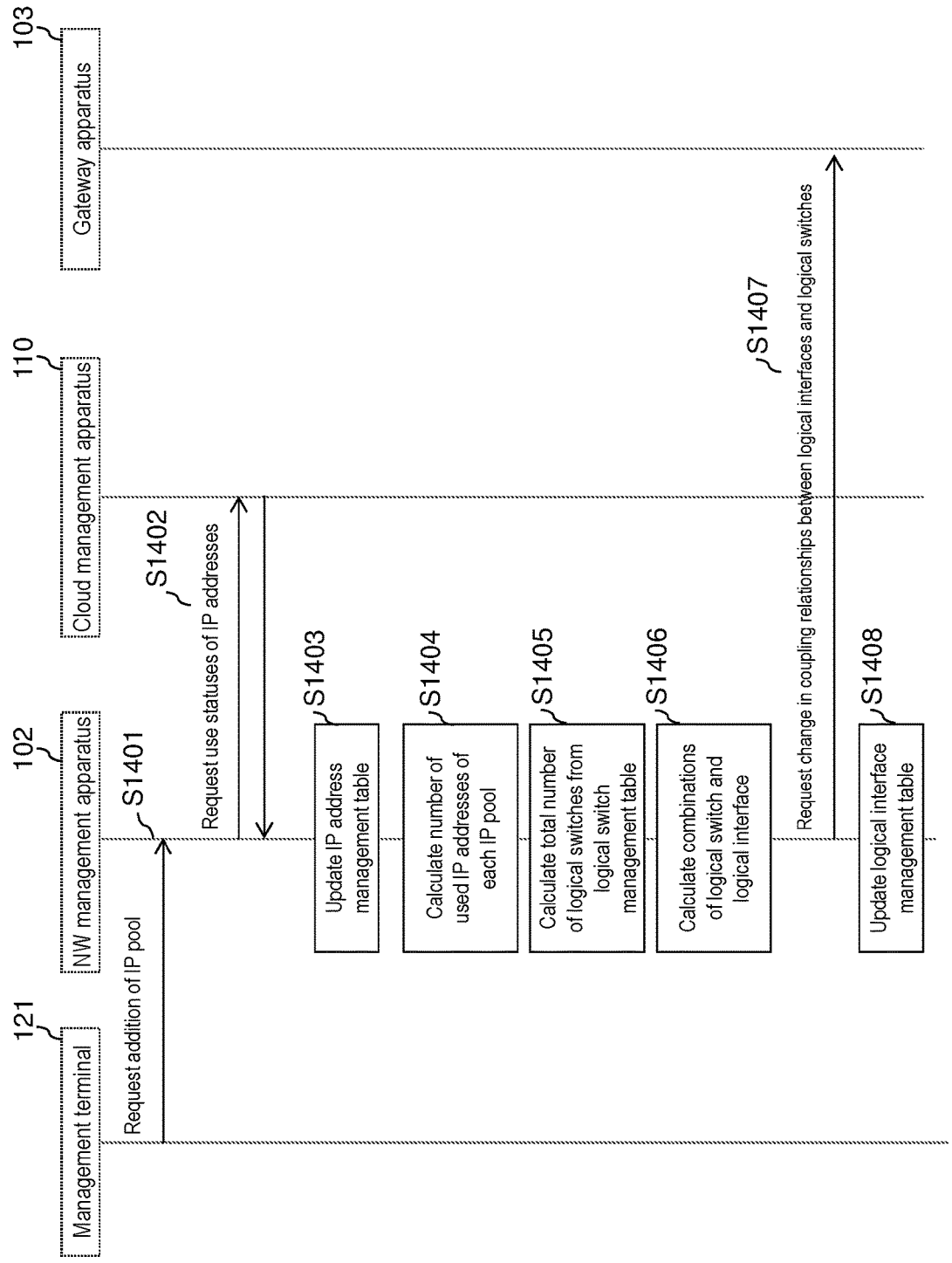
FIG. 14 is a sequence diagram showing a configuration change process of a second embodiment.

FIG. 14 is a sequence diagram showing a configuration change process of the second embodiment.

The configuration change process changes a configuration of the logical interfaces and the logical switches according to the number of used IP addresses. The cloud management apparatus 110 acquires use statuses showing whether IP addresses in the IP pool are used by the NAT functions 206 or not, from the gateway apparatus 103, and stores the use statuses into the IP pool management table 721.

When receiving a request to add an IP pool from the management terminal 121 (step S1401), the NW management apparatus 102 requests the use statuses from the cloud management apparatus 110 (step S1402). When receiving the use statuses, the NW management apparatus 102 updates a status column of the IP address management table 524 based on the use statuses (step S1403). At step S1402, the NW management apparatus 102 may acquire the use statuses from the gateway apparatus 103.

The NW management apparatus 102 refers to the status column and an IP pool ID column of the IP address management table 524 to calculate the number of used IP addresses (the number of IP addresses being used) for each IP pool (step S1404). The NW management apparatus 102 refers to a logical switch ID column of the logical switch management table 522 to calculate a total number of logical switches (step S1405).

The NW management apparatus 102 calculates such combinations of a logical switch and a logical interface that distribution of the numbers of used IP addresses corresponding to the logical switches satisfies a condition set in advance in the case of changing couplings between the logical switches and the logical interfaces, based on the total number of the logical switches and the number of used IP addresses for each IP pool (step S1406). Here, the condition may be that bias among the numbers of used IP addresses corresponding to the logical switches becomes small or that the bias becomes equal to or smaller than a threshold set in advance. Otherwise, such combinations that the bias becomes the smallest may be selected. The bias may be a maximum value among differences between the numbers of used IP addresses and an average value of the numbers, or may be a difference between a maximum value and a minimum value among the numbers of used IP addresses, or may be a standard deviation or a variance. Further, the NW management apparatus 102 requests the gateway apparatus 103 to change a configuration of the logical interfaces and the logical switches based on the calculated combinations (step S1407) and updates values of the logical interface management table 521 based on the combinations (step S1408). The gateway apparatus 103 changes couplings between the plurality of logical interfaces and the plurality of logical switches in accordance with the request.

For example, the NW management apparatus 102 may change, for a logical interface related to an IP pool with a large number of used IP addresses, the configuration of the logical interface to a configuration occupying an external network interface and change, for a logical interface related to an IP pool with a small number of used IP addresses, the configuration of the logical interface to a configuration sharing an external network interface with another IP pool, according to the IP address use status of each IP pool.

The NW management apparatus 102 may execute the configuration change process in response to a configuration change request instead of an IP pool addition request or may periodically execute the configuration change process.

The network system of the present embodiment is capable of changing couplings between logical interfaces and logical switches according to the number of used IP addresses. Thereby, load bias among a plurality of external network interfaces is prevented, and load balance in network communication is realized. Further, it is possible to calculate a load for each IP pool by using the number of used IP addresses.

[Third Embodiment]

In the present embodiment, description will be made on an example of deciding a configuration of the logical interfaces and the logical switches in consideration of communication traffic volume. Only parts of the configuration different from that of the first embodiment will be described. The storage device 502 of the NW management apparatus 102 of the present embodiment stores the communication control program 1511 which measures a communication traffic volume from the gateway apparatus 103. A method for measuring the communication traffic volume may be a well-known scheme such as SFLOW or may be an original scheme. Here, the communication traffic volume is any of the number of communication packets, communication process performance and the like. Furthermore, the NW management apparatus 102 has the communication performance management table 1501 which stores a communication traffic volume of each IP pool. The storage device 602 of the gateway apparatus 103 stores the communication amount measurement program 1521 which measures a communication traffic volume of each IP pool. A method for measuring the communication traffic volume may be a well-known scheme such as SFLOW or may be an original scheme. The NW management apparatus 102 may measure the communication traffic volume by the gateway apparatus 103 transferring a received communication packet to the NW management apparatus 102.

Figure 15:
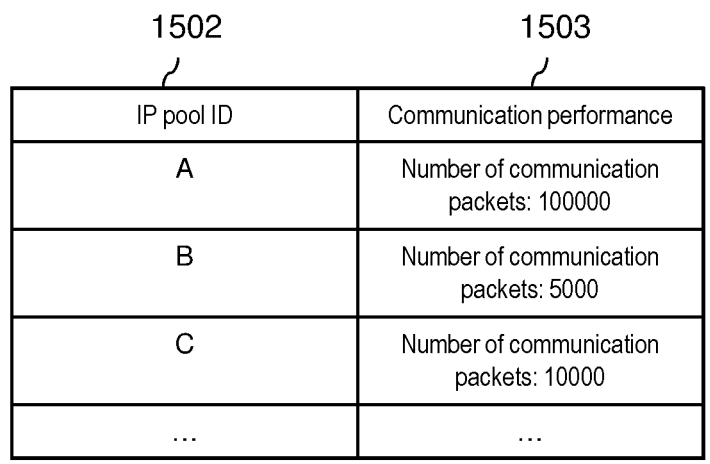
FIG. 15 shows a configuration example of a communication performance management table 1501 of the NW management apparatus 102.

FIG. 15 shows a configuration example of the communication performance management table 1501 of the NW management apparatus 102.

The communication performance management table 1501 is created by the NW management apparatus 102. The communication performance management table 1501 has an entry for each IP pool. Each entry has an IP pool ID 1502 and a communication performance 1503.

The IP pool ID 1502 is an ID for uniquely identifying an IP pool. The communication performance 1503 is a communication traffic volume of the IP pool acquired from the gateway apparatus 103. The communication traffic volume is any of the number of transferred communication packets and communication process performance (for example, transfer speed or a band width).

FIG. 16 is a sequence diagram showing a configuration change process of the third embodiment.

The configuration change process of the present embodiment changes a configuration of the logical interfaces and the logical switches in consideration of communication traffic volume.

By periodically requesting the gateway apparatus 103 to acquire communication traffic volume, the NW management apparatus 102 acquires, from any one or more units among the NAT function 206, the logical interfaces 205, the logical switches 204 and the external network interface 203*p*, communication traffic volume of the units (step S1601) and stores measurement results into the communication performance management table 1501 (step S1602). The NW management apparatus 102 refers to a logical switch ID column of the logical switch management table 522 to calculate a total number of logical switches (step S1603). The NW management apparatus 102 calculates such combinations of a logical switch and a logical interface that distribution of communication traffic volume of the logical switches satisfies a condition set in advance, based on the total number of logical switches and the acquired communication traffic volume (step S1604). Here, the condition may be that bias among the communication traffic volume of the logical switches becomes smaller or that the bias becomes equal to or smaller than a threshold set in advance. Otherwise, such a combination that the bias becomes the smallest may be selected. The bias may be a maximum value among differences between the communication traffic volume and an average value of the communication traffic volume, or may be a difference between a maximum value and a minimum value among the communication traffic volume, or may be a standard deviation or a variance. The NW management apparatus 102 requests the gateway apparatus 103 to change a configuration of the logical interfaces and the logical switches based on the calculated combinations (step S1605) and updates values of the logical interface management table 521 based on the combinations (step S1606). The gateway apparatus 103 changes couplings between the plurality of logical interfaces and the plurality of logical switches in accordance with the request.

The network system of the present embodiment can change a configuration of the logical interfaces and the logical switches in consideration of communication traffic volume. Thereby, load balance in network communication is realized.

Though combinations of a logical switch and a logical interface are calculated based on a total number of logical switches and a communication traffic volume of each logical switch in the present embodiment, it is also possible to give priority order to the logical switches and change the combinations based on the priority order.

Though the above disclosure is described on representative embodiments, one skilled in the art will understand that various changes and modifications are possible in forms and details without departing from the spirit and scope of the disclosed subject matters. For example, all the components described in the embodiments described above may not be provided. Further, a part of components of a certain embodiment may be replaced with components of another embodiment. Further, components of another embodiment may be added to components of a certain embodiment. Further, for a part of the components of each embodiment, addition of other components, deletion or replacement may be performed.

Further, a part or the whole of each of the components, functions, processing units, processing means and the like described above may be realized by hardware by designing, for example, with an integrated circuit, or may be realized by software by a processor interpreting and executing a program realizing each function.

Information such as the program realizing each function, tables and files can be stored into a storage device such as a memory, a hard disk and an SSD (Solid State Drive) or a storage medium such as an IC card, an SD card and a DVD.

Further, as for control lines and information lines, such that are thought to be necessary for description are shown, and all control lines and information lines required for implementation are not necessarily shown. Actually, almost all components can be thought to be mutually coupled.

A computer system corresponds to the network system 100 and the like. A control apparatus corresponds to the NW management apparatus 102, the cloud management apparatus 110 and the like. A first network interface corresponds to the network interfaces 203p and the like. A second network interface corresponds to the network interface 203q and the like. State information corresponds to use statuses of IP addresses, communication traffic volume and the like. A load corresponds to an amount of use of IP addresses, communication traffic volume and the like. A management apparatus corresponds to the cloud management apparatus 103 and the like.

REFERENCE SIGNS LIST 100 network system
101 cloud environment
102 NW management apparatus
103 gateway apparatus
104 network apparatus
105 host
106 VM
107 internal network
108 external network
109 client terminal
110 cloud management apparatus
121 management terminal

The invention claimed is:

1. A computer system comprising:
a gateway apparatus; and
a control apparatus coupled to the gateway apparatus,
wherein the gateway apparatus comprises:
a first network interface coupled to a first network;
a second network interface coupled to a second network; and
a processor coupled to the first network interface and the second network interface; and
wherein the control apparatus is configured to cause the processor to execute:
generating a first logical switch configured to operate as a logical network switch; and
logically coupling the first logical switch to the first network interface; and
wherein the control apparatus, in response to a first registration request requesting registration of a first IP address pool which is a first part of a first IP address space in the first network, is configured to cause the processor to execute:
generating a first logical interface configured to operate as a first logical network interface;
logically coupling the first logical interface to the first logical switch;
generating a first NAT module logically coupled to the second network interface and configured to mutually convert between a first IP address in the first IP address pool and a second IP address in a second IP address space in the second network; and
logically coupling the first NAT module to the first logical interface, and
wherein the control apparatus, in response to a second registration request requesting registration of a second IP address pool which is a second part, different from the first part, of the first IP address space in the first network, is configured to cause the processor to execute:
generating a second logical interface configured to operate as a second logical network interface;
logically coupling the second logical interface to the same first logical switch;
generating a second NAT module logically coupled to the second network interface and configured to mutually convert between a third IP address in the second IP address pool and a fourth IP address in the second IP address space in the second network; and
logically coupling the second NAT module to the second logical interface.

2. The computer system according to claim 1, wherein
the gateway apparatus comprises a third network interface coupled to the first network;
the control apparatus is configured to cause the processor to execute:
generating a second logical switch configured to operate as a logical network switch;
logically coupling the second logical switch to the third network interface;
the control apparatus, in response to a third registration request requesting registration of a third IP address pool which is a third part, different from the first and second parts, of the first IP address space in the first network, is configured to cause the processor to execute:
generating a third logical interface configured to operate as a third logical network interface;
logically coupling the third logical interface to the second logical switch;
generating a third NAT module logically coupled to the second network interface and configured to mutually convert between a fifth IP address in the third IP address pool and a sixth IP address in the second IP address space in the second network; and
logically coupling the third NAT module to the third logical interface, and
wherein the control apparatus, in response to a fourth registration request requesting registration of a fourth IP address pool which is a fourth part, different from the first, second, and third parts, of the first IP address space in the first network, is configured to cause the processor to execute:
generating a fourth logical interface configured to operate as a fourth logical network interface;
logically coupling the fourth logical interface to the same second logical switch;
generating a fourth NAT module logically coupled to the second network interface and configured to mutually convert between a seventh IP address in the fourth IP address pool and an eighth IP address in the second IP address space in the second network; and
logically coupling the fourth NAT module to the fourth logical interface.

3. The computer system according to claim 2, wherein the control apparatus is configured to cause the processor to execute:
acquiring state information showing a state of communications in the gateway apparatus,
determining coupling relationships between the first and second logical switches and the first, second, third, and fourth logical interfaces that distributes loads of the first, second, third, and fourth logical switches and satisfies a condition set in advance based on the state information, and changing the couplings between the first and second logical switches and the first, second, third, and fourth logical interfaces according to the coupling relationships.

4. The computer system according to claim 3, wherein the condition is that bias among the loads of the first, second, third, and fourth logical switches becomes small.

5. The computer system according to claim 4, wherein
the state information shows whether or not each IP address in the first, second, third, and fourth IP address pools is used by any of the first, second, third, and fourth NAT modules; and
the loads are the numbers of used IP addresses.

6. The computer system according to claim 5, further comprising:
a management apparatus coupled to the gateway apparatus and the control apparatus;
wherein the control apparatus, when receiving each of the first, second, third, and fourth registration requests, is configured to issue a respective IP address pool registration request requesting registration of the respective first, second, third, or fourth IP address pool to the management apparatus;
wherein the management apparatus, in response to the IP address pool registration request, is configured to store the respective first, second, third, or fourth IP address pool and issue a respective NAT generation request requesting generation of the respective first, second, third, or fourth NAT module to the gateway apparatus; and
wherein the processor, in response to the NAT generation request, is configured to generate the respective first, second, third, or fourth NAT module.

7. The computer system according to claim 6, wherein:
the management apparatus is configured to acquire the state information from the gateway apparatus; and
the control apparatus is configured to acquire the state information from the management apparatus.

8. The computer system according to claim 4, wherein:
the control apparatus is configured to acquire the state information showing communication traffic volume of the first and third network interfaces, the first and second logical switches, the first, second, third, and fourth logical interfaces, the first second, third, and fourth NAT modules or the second network interface, from the gateway apparatus; and
the loads are communication traffic volume.

9. The computer system according to claim 1, wherein
the processor is configured to execute a kernel; and
each of the first and second NAT modules, the first and second logical interfaces and the first logical switch is a kernel module.

10. The computer system according to claim 1, wherein
the processor is configured to execute a hypervisor;
the hypervisor generates a virtual machine comprising a virtual switch, a first virtual network interface, and a second virtual network interface;
the first and second NAT modules are executed by the virtual machine;
the first and second logical interfaces are the first and second virtual network interfaces; and
the first logical switch is the virtual switch.

11. The computer system according to claim 1, wherein
the first logical switch operates as a logical layer 2 switch; and
the first and second logical interfaces each operates as a logical layer 2 switch.

12. A control method for a gateway apparatus comprising a first network interface coupled to a first network, a second network interface coupled to a second network, a processor coupled to the first network interface and the second network interface, the method comprising:
causing the processor to execute:
generating a first logical switch configured to operate as a logical network switch; and
logically coupling the first logical switch to the first network interface; and
in response to a first registration request requesting registration of a first IP address pool which is a first part of a first IP address space in the first network, causing the processor to execute:
generating a first logical interface configured to operate as a first logical network interface;
logically coupling the first logical interface to the first logical switch;
generating a first NAT module logically coupled to the second network interface and configured to mutually convert between a first IP address in the IP first address pool and a second IP address in a second IP address space in the second network; and
logically coupling the first NAT module to the first logical interface;
in response to a second registration request requesting registration of a second IP address pool which is a second part, different from the first part, of the first IP address space in the first network, causing the processor to execute:
generating a second logical interface configured to operate as a second logical network interface;
logically coupling the second logical interface to the same first logical switch;
generating a second NAT module logically coupled to the second network interface and configured to mutually convert between a third IP address in the second IP address pool and a fourth IP address in the second IP address space in the second network; and
logically coupling the second NAT module to the second logical interface.

13. A non-transitory, computer-readable storage medium storing a program for causing a processor coupled to a first network interface coupled to a first network and a second network interface coupled to a second network to execute a control process, wherein
the control process comprises:
generating a first logical switch configured to operate as a logical network switch;
logically coupling the first logical switch to the first network interface;
in response to a first registration request requesting registration of a first IP address pool which is a first part of a first IP address space in the first network, generating a first logical interface configured to operate as a logical network interface, logically coupling the first logical interface to the first logical switch, generating a first NAT module logically coupled to the second network interface and configured to mutually convert between a first IP address in the first IP address pool and a second IP address in a second IP address space in the second network, and logically coupling the first NAT module to the first logical interface; and
in response to a second registration request requesting registration of a second IP address pool which is a second part of the first IP address space in the first network, generating a second logical interface configured to operate as a logical network interface, logically coupling the second logical interface to the same first logical switch, generating a second NAT module logically coupled to the second network interface and configured to mutually convert between a third IP address in the first IP address pool and a fourth IP address in the second IP address space in the second network, and logically coupling the second NAT module to the second logical interface.

* * * * *